Figure 1:
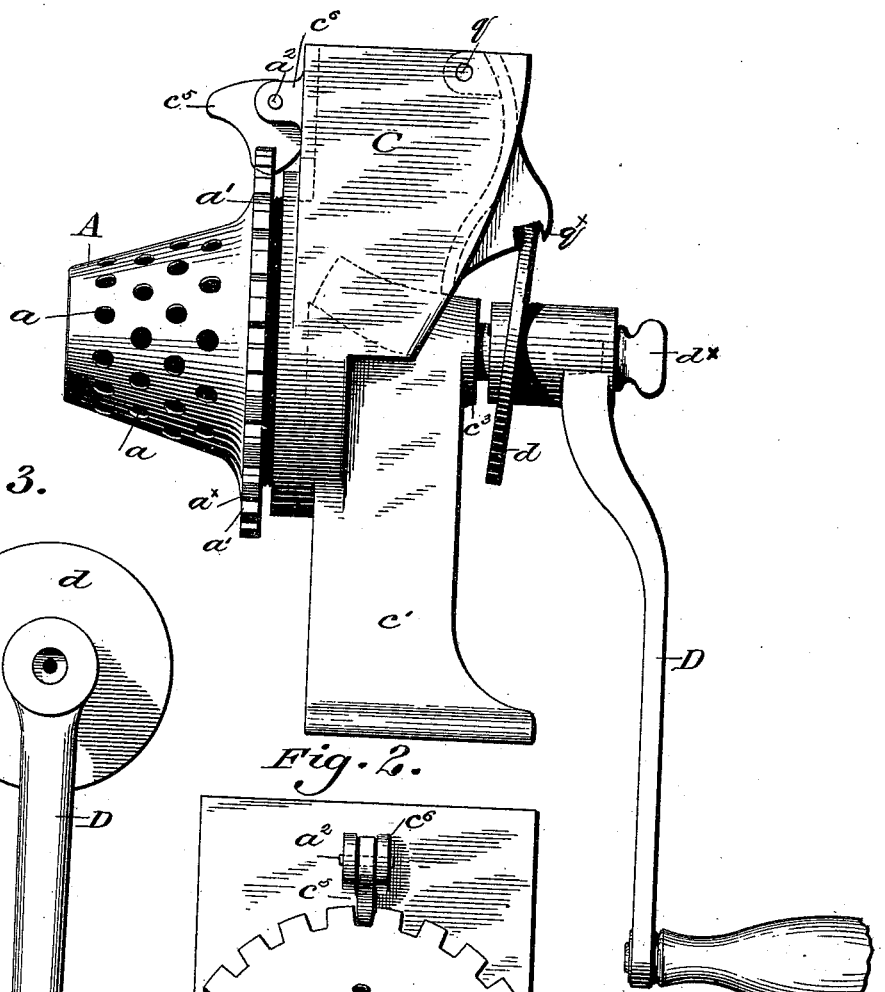

(No Model.)

H. ALBRECHT.
MACHINE FOR CUTTING MEAT.

No. 403,022.   Patented May 7, 1889.

WITNESSES.
P. B. Shepherd
J. Norman Dixon.

INVENTOR
Hermann Albrecht
By his Attorneys,
Wm. C. Strawbridge
J. Bonsall Taylor N. PETERS. Photo-Lithographer, Washington, D. C.

(No Model.)
H. ALBRECHT.
MACHINE FOR CUTTING MEAT.
No. 403,022.
3 Sheets—Sheet 2.
Patented May 7, 1889.
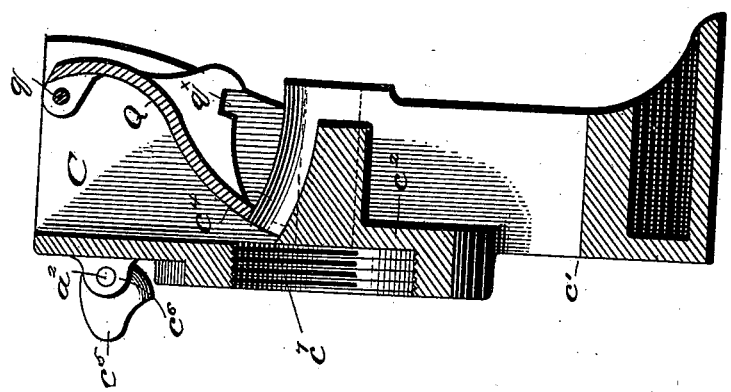
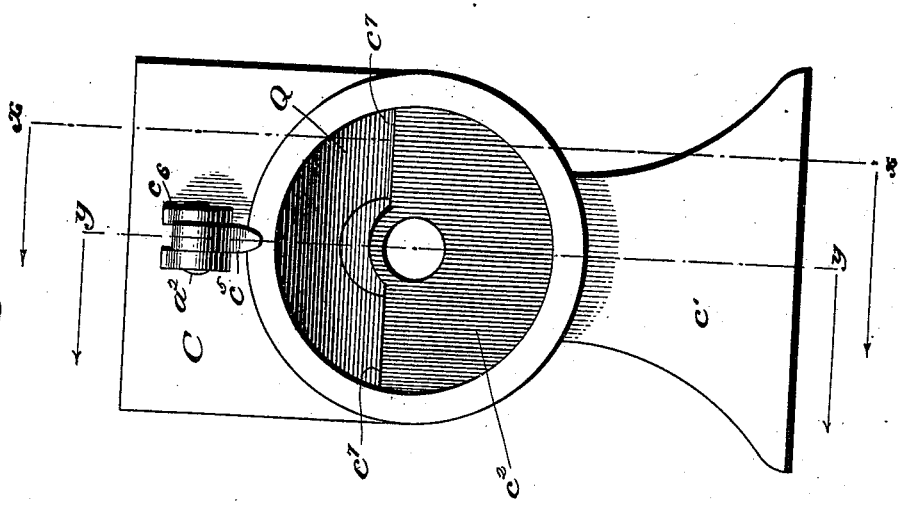
WITNESSES:
INVENTOR:
Hermann Albrecht
By his Attorneys

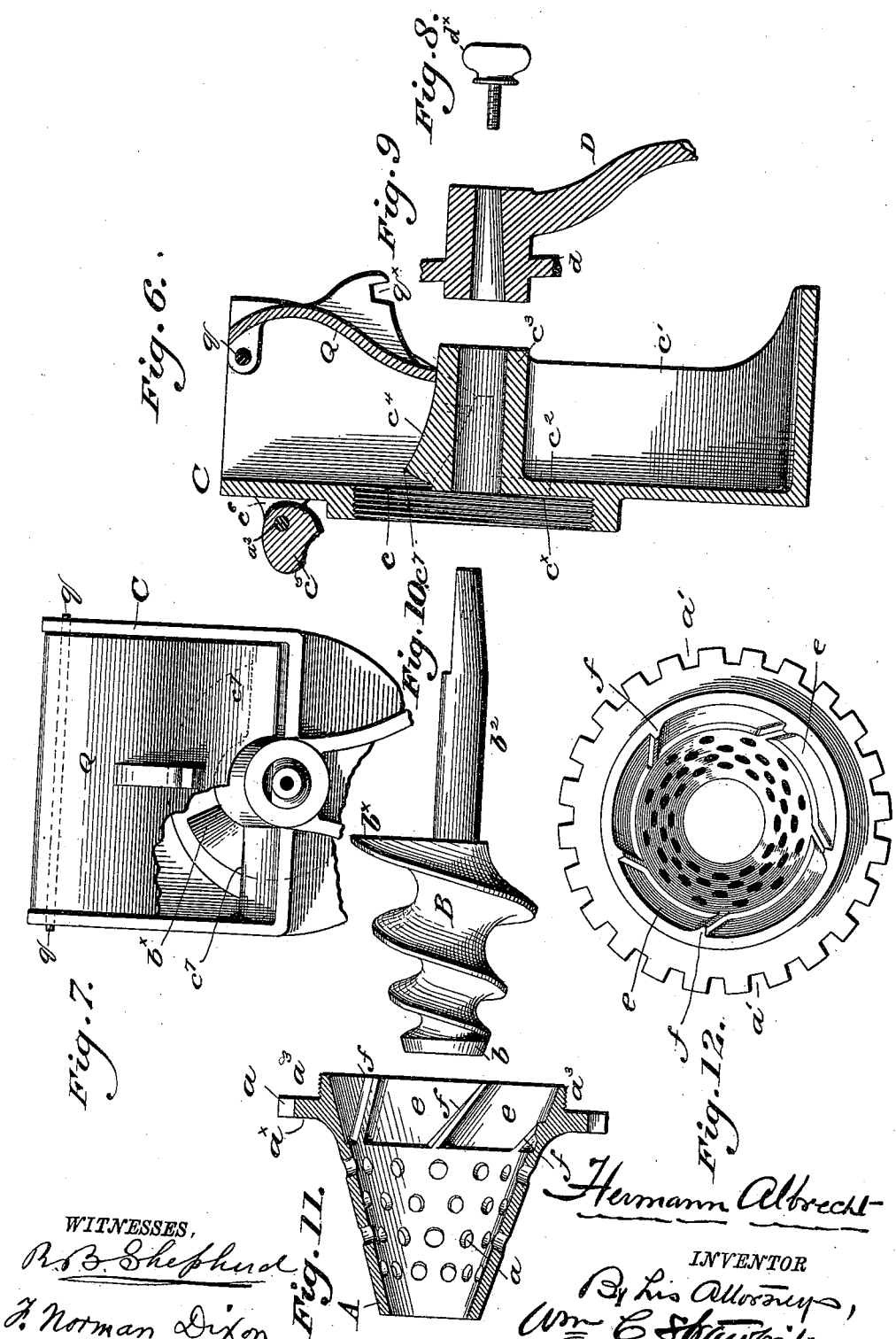

UNITED STATES PATENT OFFICE.

HERMANN ALBRECHT, OF PHILADELPHIA, PENNSYLVANIA.

MACHINE FOR CUTTING MEAT.

SPECIFICATION forming part of Letters Patent No. 403,022, dated May 7, 1889.

Application filed July 20, 1888. Serial No. 280,506. (No model.) Patented in England September 22, 1888, No. 13,740.

*To all whom it may concern:*

Be it known that I, HERMANN ALBRECHT, a citizen of the United States, residing in the city and county of Philadelphia, in the State of Pennsylvania, have invented certain Improvements in Machines for Cutting Meat and other Substances, of which the following is a specification.

This invention relates to and is an improvement upon such a meat cutter as is shown and described in United States Letters Patent No. 31,098, granted January 8, 1861, to Purches Miles, which is a machine composed, essentially, of a conical shell having a hopper at its larger and an outlet at its smaller end, and containing spiral grooves formed by sharp-edged projections cast with the shell, within which is fitted a rotary cutter-head provided with spiral knives, and in which, when the cutter head is rotated, there is a shearing action upon the substance to be cut due to the fact that the rotating knives and ribs upon the case, constituting as they do two blades, are so set as to form an acute angle with each other and in the rotation of the cutter-head, sweep past each other at such angle like the edges of a pair of shears, the edges as they cross constantly cutting or shearing the meat as it passes from one rib to the other, and the knives serving to discharge it through openings or perforations in a plate at the smaller end of the shell after a preliminary cutting action has been performed upon the meat before it reaches and is further cut at and discharged through said perforated plate,—the machine as an entirety being, in a word, intentionally adapted to cut and actually, in consequence of the action of the spiral ribs in the shell in conjunction with the spiral blades of the screw, cutting the meat before it reaches the perforated plate, in its passage through which, however, it is, as stated, subjected to an additional cutting due to the action of the outer or smaller extremities of the spiral blades of the cutter-head in sweeping past the perforations.

My invention is, therefore, to be contradistinguished from another class of machines employed for the same purpose, the main object of which, however, is to get rid of preliminary cutting or chopping knives, and to rely for their cutting character entirely upon a perforated plate at the outer end of the casing and a knife sweeping the surface of such perforated plate, and in which machines the casing is provided with longitudinal ribs and with a non-cutting forcing screw or piston, for imparting direct pressure to a crude uncut substance fed into the hopper end of the machine against the perforated plate without any action on the substance during its passage to the plate excepting that for effecting the desired pressure, the aim being to dispense with intervening choppers to cut the substance in transit. Machines of this last named class have been judicially characterized as possessing a "preliminary non-cutting characteristic," and by this characteristic are to be contradistinguished from machines of the first named class to which my improvement relates in which there is preliminary cutting or cutting prior to the final cutting to the ultimate sizes.

A cutter embodying my improvement is represented in the accompanying drawings and hereinafter described, the particular subject matter claimed as novel being set forth in the appended claiming clauses.

Figure 3:
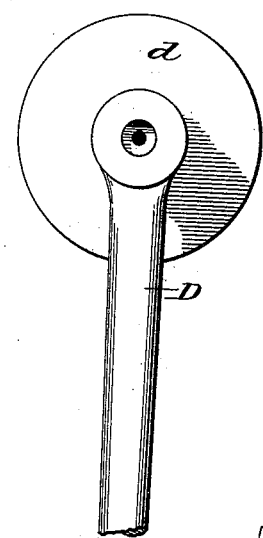
Figure 2:
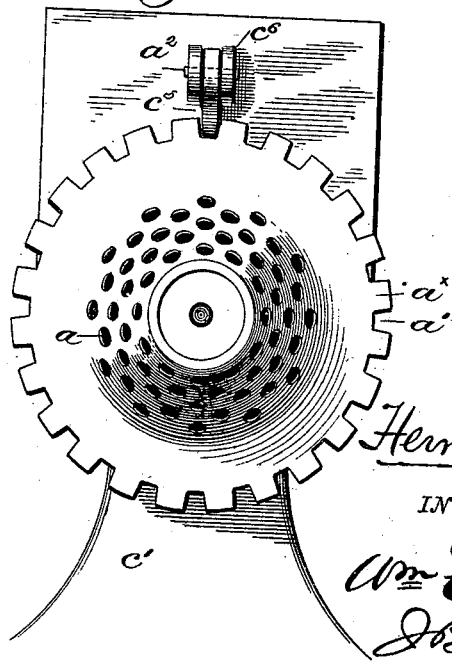

In the drawings, Figure 1 is a side elevational view of a machine embodying my invention. Fig. 2 is a front or face elevational view of the same, sight being taken from the left hand side of said Fig. 1. Fig. 3 is a rear elevational view of a portion of the crank and disk cam, sight being taken from the right hand side of Fig. 1. Fig. 4 is a front or face elevational view of the hopper and stand of the machine, the conical shell being removed to expose the shell socket and the discharge opening of the hopper. Fig. 5 is a right hand side sectional elevation through the hopper and stand shown in Fig. 4, the hopper feed plate being swung forward in the plane of the dotted line $x$—$x$ upon said figure, and sight being taken in the direction of the arrows upon said line. Fig. 6 is a similar view of the same parts, the hopper feed plate being swung back in the plane of the dotted line $y$—$y$ of Fig. 4. Fig. 7 is a fragmentary rear elevational view of the hopper and a portion of its stand, the view being designed to exhibit the hopper and its inclined floor, the feed plate, and the heel of the cutter head. Fig. 8 is a side elevation of a thumb screw by the aid of which the crank can be conveniently secured to the journal of the cutter head. Fig. 9 is a fragmentary, central, vertical, longitudinal sectional elevation of a portion of the crank and disk cam. Fig. 10 is a side elevational view of the cutter head and its journal. Fig. 11 is a central, vertical, longitudinal, sectional elevation through the conical shell of the machine; and Fig. 12 is an inside elevational view of said shell looking toward its outer opening.

Similar letters of reference indicate corresponding parts.

In the drawings, A represents a conical open-ended shell. To the extent, preferably of half its length from its outer opening inwardly to its inner, this conical shell is provided with circumscribing series of perforations or delivery holes $a$ of the character set forth in United States Letters Patent No. 352,023, granted November 2, 1886, to Oliver D. Woodruff,—the perforations of the respective series being preferably staggered or alternated in disposition.

At the larger end of and within the shell, and extending for such remaining portion of its length as is not occupied by the perforations, there are, beyond the innermost ring or series of perforations, spiral grooves $e$ which are formed by spiral projections $f$ cast within the shell. The grooves $e$ gradually decrease in dimensions both in width and depth from the larger toward the smaller end of the shell. The projections $f$ taper in one direction, and are formed with abrupt cutting edges which face away from said taper, as shown in Fig. 12. The cutting edges of these projections complete the conical contour of the interior of the shell as an entirety.

The shell is conveniently formed at its larger extremity with external screw threads $a^3$, by means of which the shell can be removably applied and secured to a threaded socket $c^x$ formed in the front face of a stand $c'$, of any preferred form and character, which supports the machine and is the base of and preferably formed integral with a hopper or feed opening C the discharge opening $c$ of which feeds into the socket and is preferably co-extensive with the entire upper portion thereof, as shown in Figs. 4 and 6. The lower rear portion of said socket, as well as of the shell when applied is closed by a web or back wall $c^2$ being a part of the casting of the stand. The stand is also formed with a bearing $c^3$ axial with respect to the socket $c^x$, and, therefore, with respect to the conical shell when applied, and opening through the web or back wall $c^2$, as shown in Figs. 4, 6, and 7.

The floor $C^4$ or bottom of the hopper extends from the upper line of the web or back wall $c^2$ of the socket, with which it forms a cutting edge $c^7$, backwardly and downwardly with a slight scoop, concavity, or curvature, sufficient to cause it to be closely swept by the lower edge of a vibrating feed plate Q which forms the back wall of the hopper proper and is, conveniently, hingedly applied to the upper rear portion of the sides of said hopper by means of a hinge pin $q$.

The lower edge of the feed plate is cut to fit the cylindric form of the upper portion of the bearing $c^3$, and the latter, as shown in Fig. 7, is curved upwardly and forwardly with a curvature corresponding to that of the floor of the hopper, in order to fill the opening referred to in the lower edge of the feed plate whatever be the position of said feed plate,— an expedient of construction resorted to to prevent escape of material from the hopper.

B is a rotary cutter-head operating within the conical shell,—to the interior of which shell its peripheral cutting edge conforms,— and formed of a single spiral knife extending from a circumferential conical bearing disk $b$ at its extreme outer end, which closes the outer opening of the shell, backward as far as the back wall $c^2$ of the socket. The rear end of the spiral knife which forms the cutter head B terminates in a radial cutting heel $b^x$, right angular to the axis of the cutter head, which in the rotation of said cutter head wipes the face of the back wall $c^2$ of the socket and acts in co-operation with the upper cutting edge $c^7$ of said back wall as one of the blades of a rotary shears of which said cutting edge is the other. The peripheral cutting edge of the spiral knife runs with a gradually diminishing pitch from this heel to the outer conical bearing disk in which it vanishes. The cutter head B has a journal $b^2$ at its inner end, which fits, rests, and revolves in, the bearing $c^3$ formed in the stand $c'$ at the larger end of the shell A.

The outer end of the cutter head, as stated, simply rests in the smaller end of the shell. The journal $b^2$ has a crank D on its outer projecting extremity, and this crank, which may be secured by the thumb screw $d^x$ is conveniently formed or provided with a disk-cam $d$ which is engaged with a cam bearing $q^x$ connected with or applied to the outside face of the hopper feed plate, with the result that when the crank is turned the feed plate is caused to vibrate. The cam is, moreover, so timed or set with respect to the cutting heel $b^x$ of the cutter head, as to occasion the forward movement of the feed plate during the period when said heel is sweeping past and performing its shearing function with respect to the cutting edge $c^7$ of the back wall of the socket and shell. Other means than a crank may of course be applied to drive the cutter head, and other devices than a cam for vibrating the feed plate.

The conical shell is, conveniently, externally provided just in advance of its screw threads $a^3$ with an outwardly projecting circumferential flange $a^x$ which is provided with a series of radial notches $a'$, any one of which is adapted to be engaged by a gravity notch pawl $c^5$ pivoted, conveniently by means of the pivot pin $a^3$, between ears $c^6$ formed on the front wall of the hopper. By this contrivance the shell, after being screwed up to the desired position, can be locked in that position.

Having thus described the construction of a cutter embodying my improvements its operation will be easily understood:—The meat, or other plastic yielding or other substance, to be cut, is fed into the hopper, and,—the crank disk-cam hopper feed-plate and cutter-head heel being in the position represented in Figs. 1 and 7,—rotation is then imparted to the crank, with the result that a considerable portion of the total mass of meat is, first, by the consequent forward movement of the feed plate forcibly fed into the conical shell just at the instant that the cutting heel of the cutter head sweeps downwardly past the cutting edge with which it co-operates to sever or cut off the mass so fed forward and detach it from the mass remaining in the hopper,—and is, as to said detached portion thereafter, under the continuing rotation of the cutter head, first, during its passage through the larger portion of the conical shell subjected to a constant and thorough cutting or shearing action which serves to cut it up to different sizes large and small, and is then, secondly, after being so cut up by the shearing action of the larger or basal portion of the continuous spiral knife of the cutter head acting against the cutting edges of the spiral projections, during its transit through the smaller portion of the shell subjected to a still further cutting action consequent upon the sweeping of the smaller portions of the spiral knife of the cutter head past the perforations in the conical shell, into which perforations such cut-up or divided pieces of the meat are by the continued rotation of the cutter head in part forced, and through which all of the meat is by the action of the cutter head eventually discharged in small cut pieces.

Having thus described my invention, I claim:—

1. The combination, in a machine for cutting up plastic or yielding substances, of the following instrumentalities, namely:—first, a conical shell having within its larger end spiral cutting ribs, and beyond said ribs perforations through its walls; second, a rotary cutter head formed as a continuous spiral knife the cutting edge of which conforms to the interior of the shell and forms an acute angle with the ribs within said shell; and, third, a hopper at or near the larger end of the shell; substantially as and for the purposes set forth.

2. The combination, in a machine for cutting up plastic or yielding substances, of the following instrumentalities, namely:—first, a conical shell having within its larger end spiral cutting ribs, and beyond said ribs perforations through its walls; second, a rotary cutter head formed as a continuous spiral knife, the cutting edge of which conforms to the interior of the shell and forms an acute angle with the ribs within said shell; third, a hopper at or near the larger end of the shell; and, fourth, a movable feed plate within said hopper; substantially as and for the purposes set forth.

3. The combination, in a machine for cutting up plastic or yielding substances, of the following instrumentalities, namely:—first, a conical shell having within its larger end spiral cutting ribs, and beyond said ribs perforations through its walls; second, a rotary cutter head formed as a continuous spiral knife the cutting edge of which conforms to the interior of the shell and forms an acute angle with the ribs within said shell; third, a journal projecting from the larger end of said cutter head; fourth, a bearing for said journal beyond the larger end of the conical shell; and, fifth, a hopper at or near the larger end of said shell; substantially as and for the purposes set forth.

4. The combination, in a machine for cutting up plastic or yielding substances, of the following instrumentalities, namely:—first, a conical shell having within its larger end spiral cutting ribs, and beyond said ribs perforations through its walls; second, a rotary cutter head formed as a continuous spiral knife the cutting edge of which conforms to the interior of the shell and forms an acute angle with the ribs within said shell; third, a journal projecting from the larger end of said cutter head; fourth, a bearing for said journal beyond the larger end of the conical shell; fifth, a hopper at or near the larger end of said shell; sixth, a vibratory feed plate applied to said hopper; seventh, a cam upon the journal of the cutter head which occasions the vibratory movement of the feed plate; and, eighth, means for rotating the journal cutter head and cam, substantially as and for the purposes set forth.

5. The combination, in a machine for cutting up plastic or yielding substances, of the following instrumentalities, namely:—first, a conical shell having within its larger end spiral cutting ribs, and beyond said ribs perforations through its walls; second, a rotary cutter head formed as a continuous spiral knife the cutting edge of which conforms to the interior of the shell and forms an acute angle with the ribs within said shell and which is provided with a radial cutting heel; and, third, a hopper at or near the larger end of the shell the discharge opening of which is into said shell across a cutting edge with which the cutting heel of the cutter head co-operates and forms a shears; substantially as and for the purposes set forth.

6. The combination, in a machine for cutting up plastic or yielding substances, of the following instrumentalities, namely:—first, a conical shell having within its larger end spiral cutting ribs, and beyond said ribs perforations through its walls; second, a rotary cutter head formed as a continuous spiral knife the cutting edge of which conforms to the interior of the shell and forms an acute angle with the ribs within said shell and which is provided with a radial cutting heel; third, a hopper at or near the larger end of the shell the discharge opening of which is into said shell across a cutting edge with which the cutting heel of the cutter head co-operates and forms a shears; fourth, a vibratory feed plate applied to said hopper; fifth, a cam upon the journal of the cutter head, suitable means, essentially, for instance, such as set forth, for occasioning the vibratory movement of the feed plate; and, sixth, means for rotating the cutter head; substantially as and for the purposes set forth.

In testimony that I claim the foregoing as my invention I have hereunto signed my name this 18th day of July, A. D. 1888.

HERMANN ALBRECHT.

In presence of—
J. BONSALL TAYLOR,
WM. C. STRAWBRIDGE.